United States Patent
Gruber et al.

(10) Patent No.: US 10,621,690 B2
(45) Date of Patent: Apr. 14, 2020

(54) STORING BANDWIDTH-COMPRESSED GRAPHICS DATA

(71) Applicant: QUALCOMM Incorporated, San Diego, CA (US)

(72) Inventors: Andrew Evan Gruber, Arlington, MA (US); Rexford Alan Hill, San Diego, CA (US); Shambhoo Khandelwal, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 14/857,303

(22) Filed: Sep. 17, 2015

(65) Prior Publication Data
US 2017/0083997 A1    Mar. 23, 2017

(51) Int. Cl.
*G06T 1/60* (2006.01)
*G06T 1/20* (2006.01)
*G06T 11/40* (2006.01)
*G06F 12/02* (2006.01)

(52) U.S. Cl.
CPC ............ *G06T 1/60* (2013.01); *G06F 12/0207* (2013.01); *G06T 1/20* (2013.01); *G06T 11/40* (2013.01); *G06F 2212/401* (2013.01); *G06T 2210/08* (2013.01)

(58) Field of Classification Search
CPC .. G06T 1/60; G06T 2210/08; G06F 2212/401
USPC ........................................................ 345/543
See application file for complete search history.

(56) References Cited

U.S. PATENT DOCUMENTS

| | | | |
|---|---|---|---|
| 7,023,437 B1 | 4/2006 | Voorhies et al. | |
| 7,672,005 B1* | 3/2010 | Hobbs | H04N 1/41 345/543 |
| 7,886,116 B1 | 2/2011 | Everitt | |
| 8,378,859 B2 | 2/2013 | Frederiksen et al. | |
| 2007/0018990 A1* | 1/2007 | Shreiner | G06T 15/005 345/505 |
| 2007/0269138 A1* | 11/2007 | Eguchi | G06T 1/60 382/305 |

(Continued)

OTHER PUBLICATIONS

Akenine-Moller T., et al., "Graphics Processing Units for Handhelds," Proceedings of the IEEE, IEEE. New York, US, May 2008 (May 2008),vol. 96(5), pp. 779-789, XP011207044, ISSN: 0018-9219.

(Continued)

*Primary Examiner* — Mark K Zimmerman
*Assistant Examiner* — Jonathan M Cofino
(74) *Attorney, Agent, or Firm* — Shumaker & Sieffert, P.A.

(57) ABSTRACT

A computing device may allocate a plurality of blocks in the memory, wherein each of the plurality of blocks is of a uniform fixed size in the memory. The computing device may further store a plurality of bandwidth-compressed graphics data into the respective plurality of blocks in the memory, wherein one or more of the plurality of bandwidth-compressed graphics data each has a size that is smaller than the fixed size. The computing device may further store data associated with the plurality of bandwidth-compressed graphics data into unused space of one or more of the plurality of blocks that contains the respective one or more of the plurality of bandwidth-compressed graphics data.

26 Claims, 6 Drawing Sheets

---

STORE A PLURALITY OF BANDWIDTH-COMPRESSED GRAPHICS DATA INTO A RESPECTIVE PLURALITY OF BLOCKS IN MEMORY — 102

STORE DATA ASSOCIATED WITH THE PLURALITY OF BANDWIDTH-COMPRESSED GRAPHICS DATA INTO UNUSED SPACE OF ONE OR MORE OF THE PLURALITY OF BLOCKS — 104

(56) References Cited

U.S. PATENT DOCUMENTS

| | | | |
|---|---|---|---|
| 2007/0285439 A1* | 12/2007 | King | G09G 5/397 |
| | | | 345/638 |
| 2008/0012871 A1 | 1/2008 | Blais | |
| 2008/0094407 A1 | 4/2008 | Xu et al. | |
| 2009/0066694 A1* | 3/2009 | Redshaw | G06T 15/005 |
| | | | 345/423 |
| 2010/0182402 A1* | 7/2010 | Nakajima | G09G 5/006 |
| | | | 348/42 |
| 2011/0175907 A1* | 7/2011 | Tokuda | H04N 13/0022 |
| | | | 345/419 |
| 2011/0219058 A1 | 9/2011 | Schmieder et al. | |
| 2012/0206466 A1* | 8/2012 | Sharp | G06T 1/60 |
| | | | 345/543 |
| 2013/0322756 A1* | 12/2013 | Thakkar | G06F 17/3028 |
| | | | 382/173 |
| 2014/0118348 A1 | 5/2014 | Hakura et al. | |
| 2015/0227468 A1* | 8/2015 | Berger | G06F 3/06 |
| | | | 711/203 |
| 2015/0278981 A1 | 10/2015 | Akenine-Moller | |
| 2016/0358043 A1* | 12/2016 | Mu | G06F 16/51 |

OTHER PUBLICATIONS

International Search Report and Written Opinion—PCT/US2016/044975—ISA/EPO—dated Nov. 21, 2016, 19 pp.
International Report on Patentability of International Application No. PCT/US2016/044975 dated Aug. 28, 2017, 11 pp.

\* cited by examiner

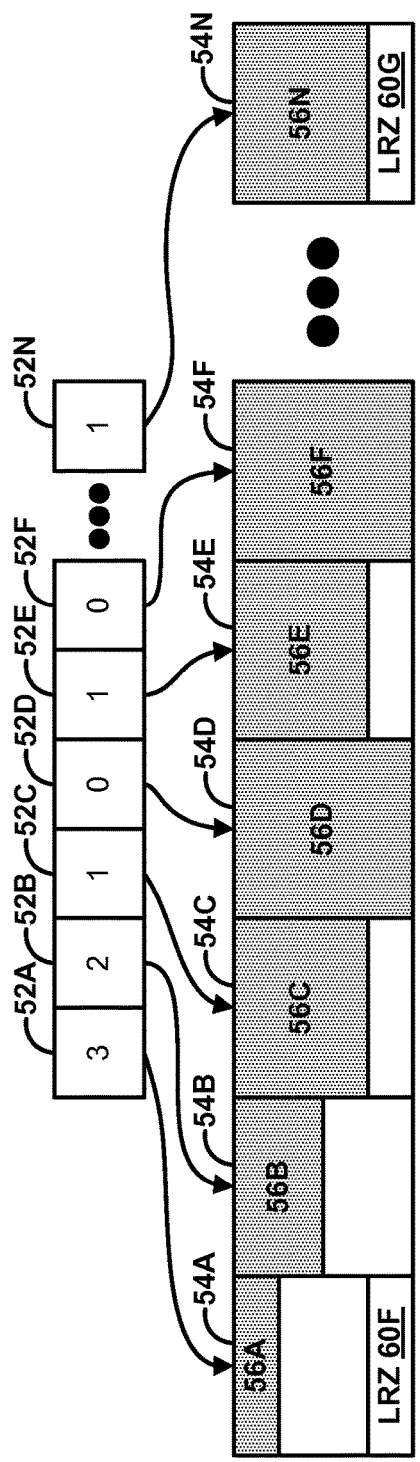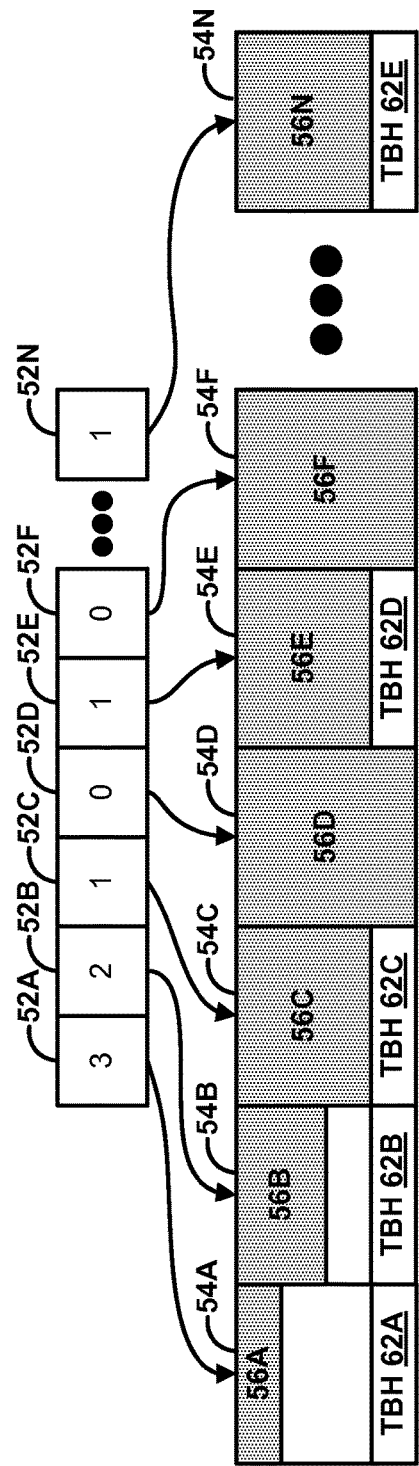
FIG. 3C
FIG. 3D

STORING BANDWIDTH-COMPRESSED GRAPHICS DATA

TECHNICAL FIELD

This disclosure relates to data storage, and more specifically to storing bandwidth-compressed graphics data in memory.

BACKGROUND

A device that provides content for visual presentation on an electronic display generally includes a graphics processing unit (GPU). The GPU renders pixels that are representative of the content on a display. The GPU generates one or more pixel values for each pixel on the display and performs graphics processing on the pixel values for each pixel on the display to render each pixel for presentation that performs fragment shading of the fragments generated by the rasterization stage.

SUMMARY

The techniques of this disclosure generally relate to techniques for storing a plurality of bandwidth-compressed graphics data in memory along with additional data that is associated with the plurality of bandwidth-compressed graphics data. The plurality of bandwidth-compressed graphics data may vary in size, and the plurality of bandwidth-compressed graphics data are stored in uniformly-sized blocks in memory that may accommodate the largest bandwidth-compressed graphics data out of the plurality of bandwidth-compressed graphics data. Therefore, storing the plurality of bandwidth-compressed graphics data into the uniformly-sized blocks in memory may result in remaining unused space in some of the blocks in memory that store the plurality of bandwidth-compressed graphics data. Such unused space in some of the blocks in memory may be utilized to store additional data that is associated with the plurality of bandwidth-compressed graphics data, such as depth data associated with the plurality of bandwidth-compressed graphics data or hash codes that identify each of the plurality of bandwidth-compressed graphics data.

In one example of the disclosure, a method for graphics processing may include storing, by at least one processor, a plurality of bandwidth-compressed graphics data into a respective plurality of blocks in memory, wherein each of the plurality of blocks is of a uniform fixed size in the memory, and wherein one or more of the plurality of bandwidth-compressed graphics data has a size that is smaller than the fixed size. The process may further include storing, by the at least one processor, data associated with the plurality of bandwidth-compressed graphics data into unused space of one or more of the plurality of blocks that contains the respective one or more of the plurality of bandwidth-compressed graphics data.

In another example of the disclosure, an apparatus configured to process graphics data may include memory. The apparatus may further include at least one processor configured to: store a plurality of bandwidth-compressed graphics data into a respective plurality of blocks in the memory, wherein each of the plurality of blocks is of a uniform fixed size in the memory, and wherein one or more of the plurality of bandwidth-compressed graphics data has a size that is smaller than the fixed size; and store data associated with the plurality of bandwidth-compressed graphics data into unused space of one or more of the plurality of blocks that contains the respective one or more of the plurality of bandwidth-compressed graphics data.

In another example of the disclosure, an apparatus may include means for storing a plurality of bandwidth-compressed graphics data into a respective plurality of blocks in memory, wherein each of the plurality of blocks is of a uniform fixed size in the memory, and wherein one or more of the plurality of bandwidth-compressed graphics data has a size that is smaller than the fixed size. The apparatus may further include means for storing data associated with the plurality of bandwidth-compressed graphics data into unused space of one or more of the plurality of blocks that contains the respective one or more of the plurality of bandwidth-compressed graphics data.

The details of one or more examples are set forth in the accompanying drawings and the description below. Other features, objects, and advantages will be apparent from the description and drawings, and from the claims.

BRIEF DESCRIPTION OF DRAWINGS

FIGS. 3A-3F are conceptual diagrams illustrating example techniques for storing bandwidth-compressed graphical data in memory.

DETAILED DESCRIPTION

Figure 1:
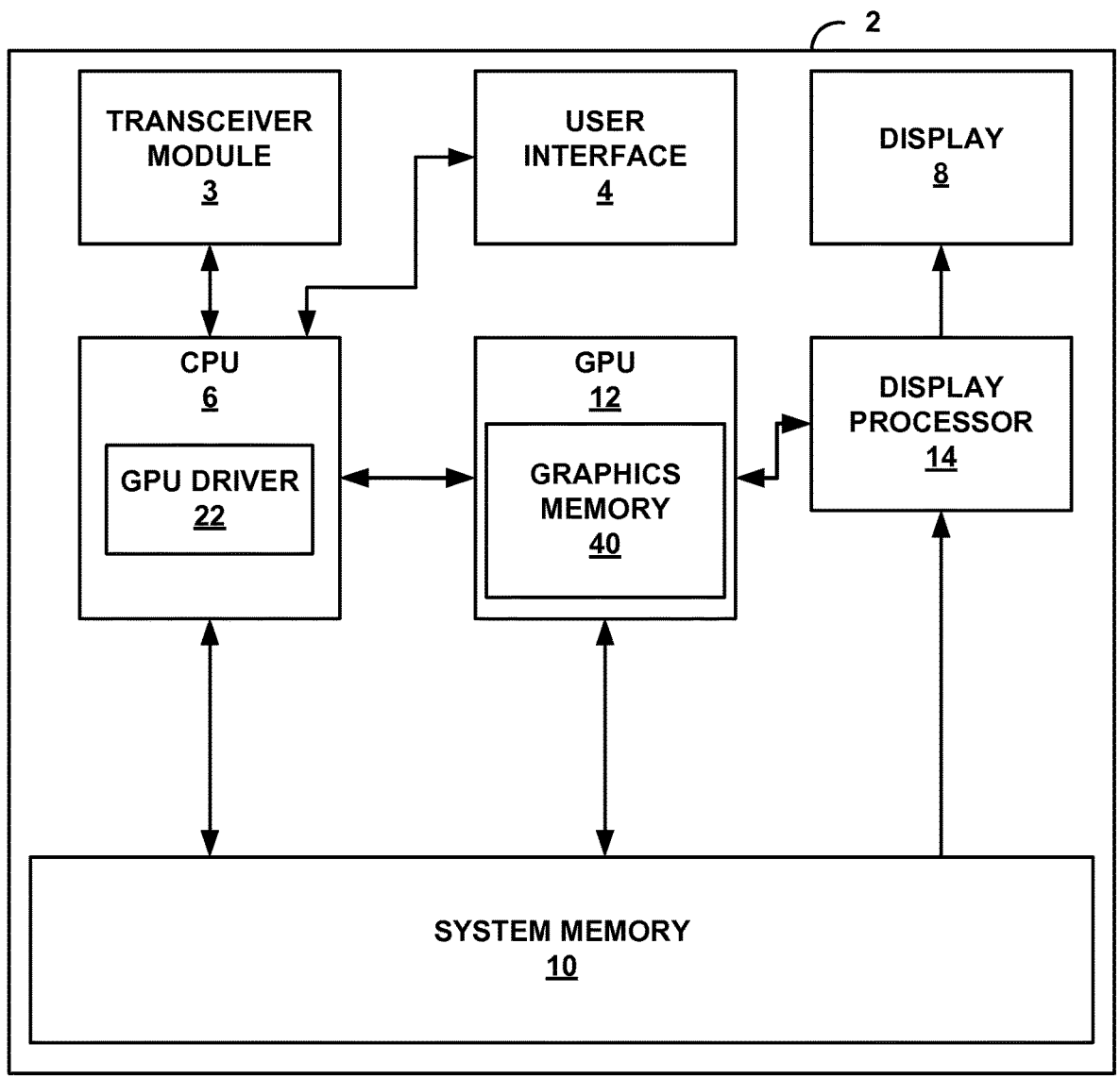
FIG. 1 is a block diagram illustrating an example computing device that may be configured to implement one or more aspects of this disclosure for storing bandwidth-compressed graphical data in memory.

Bandwidth-compressed graphics data is graphics data that is compressed so that it may be transferred more quickly through busses of a computing device. As a graphics processing unit (GPU) of a computing device performs graphics processing operations on graphics data, such as a surface, the computing device may transfer the surface through a bus between the GPU and memory or between different memories. For example, the computing device may perform a compositing operation that combines two different surfaces by transferring those two surfaces from memory to the GPU to perform the compositing operation, and transferring the resulting composited surface from the GPU back to memory. Thus, by reducing the size of the surface via compression, the computing device may transfer the surface more quickly between components of the computing device, thereby improving performance of the computing device.

The computing device may perform bandwidth compression of a surface by dividing the surface into sub-regions and compressing each of the sub-regions of the surface to generate a plurality of bandwidth-compressed graphics data. The plurality of bandwidth-compressed graphics data may vary in size due to differences in content between sub-regions of the surface. For example, a computing device may be able to compress a sub-region of the surface that uniformly contains pixels of a single color into a relatively smaller size than another sub-region of the surface that contains pixels of many different colors.

The computing device may store the plurality of bandwidth-compressed graphics data into a plurality of uniformly-sized blocks that the computing device allocates in memory. Each of the blocks is large enough to contain the largest one of the plurality of bandwidth-compressed graphics data. Because each of the plurality of blocks are the same size while the plurality of bandwidth-compressed graphics data may vary in size, storing the plurality bandwidth-compressed graphics data into the plurality of blocks may result in one or more of the blocks that each has unused space that is not occupied by the respective bandwidth-compressed graphics data stored in the block.

In accordance with aspects of the present disclosure, the computing device may store other data associated with the plurality of bandwidth-compressed graphics data into the unused space of the one or more of the blocks. For example, instead of storing depth data associated with the plurality of bandwidth-compressed graphics data into a separate area (e.g., block) in memory, the computing device may instead store such depth data in the unused space of the one or more of the blocks. Similarly, the computing device may store hash codes that identify each of the plurality of bandwidth-compressed graphics data in the unused space of the one or more of the blocks. In this way, the computing device may utilize the unused space in the plurality of blocks to store additional data associated with the plurality of bandwidth-compressed graphics data, thereby increasing memory utilization efficiency of the computing device.

The other data that the computing device may store into the unused space of the one or more blocks may be optimization surfaces, in that the computing device may use such data to optimize the performance of graphics operations on the graphics data. For example the computing device may utilize the depth data to increase its performance in rendering the associated graphics data, while the computing device may utilize the hash codes to increase its performance of certain graphical operations on the graphics data. As such, the computing device may store any number of additional data other than depth data or hash codes into the unused space of the one or more blocks, including storing additional optimization surfaces that may be used to optimize the rendering of the graphics data.

FIG. 1 is a block diagram illustrating an example computing device that may be configured to implement one or more aspects of this disclosure for storing bandwidth-compressed graphical data in memory. As shown in FIG. 1, device 2 may be a computing device including but not limited to video devices, media players, set-top boxes, wireless handsets such as mobile telephones and so-called smartphones, personal digital assistants (PDAs), desktop computers, laptop computers, gaming consoles, video conferencing units, tablet computing devices, and the like. In the example of FIG. 1, device 2 may include central processing unit (CPU) 6, system memory 10, and GPU 12. Device 2 may also include display processor 14, transceiver module 3, user interface 4, and display 8. Transceiver module 3 and display processor 14 may both be part of the same integrated circuit (IC) as CPU 6 and/or GPU 12, may both be external to the IC or ICs that include CPU 6 and/or GPU 12, or may be formed in the IC that is external to the IC that includes CPU 6 and/or GPU 12.

Device 2 may include additional modules or units not shown in FIG. 1 for purposes of clarity. For example, device 2 may include a speaker and a microphone, neither of which are shown in FIG. 1, to effectuate telephonic communications in examples where device 2 is a mobile wireless telephone, or a speaker where device 2 is a media player. Device 2 may also include a video camera. Furthermore, the various modules and units shown in device 2 may not be necessary in every example of device 2. For example, user interface 4 and display 8 may be external to device 2 in examples where device 2 is a desktop computer or other device that is equipped to interface with an external user interface or display.

Examples of user interface 4 include, but are not limited to, a trackball, a mouse, a keyboard, and other types of input devices. User interface 4 may also be a touch screen and may be incorporated as a part of a display 8. Transceiver module 3 may include circuitry to allow wireless or wired communication between computing device 2 and another device or a network. Transceiver module 3 may include modulators, demodulators, amplifiers and other such circuitry for wired or wireless communication.

CPU 6 may be a microprocessor, such as a central processing unit (CPU) configured to process instructions of a computer program for execution. CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. Additionally, CPU 6 may execute GPU driver 22 for controlling the operation of GPU 12. The user may provide input to computing device 2 via one or more input devices (not shown) such as a keyboard, a mouse, a microphone, a touch pad or another input device that is coupled to computing device 2 via user interface 4.

The software applications that execute on CPU 6 may include one or more graphics rendering instructions that instruct CPU 6 to cause the rendering of graphics data to display 8. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API.

In order to process the graphics rendering instructions of the software applications, CPU 6 may issue one or more graphics rendering commands to GPU 12 (e.g., through GPU driver 22) to cause GPU 12 to perform some or all of the rendering of the graphics data. In some examples, the graphics data to be rendered may include a list of graphics primitives, e.g., points, lines, triangles, quadrilaterals, triangle strips, etc.

GPU 12 may be configured to perform graphics operations to render one or more graphics primitives to display 8. Thus, when one of the software applications executing on CPU 6 requires graphics processing, CPU 6 may provide graphics commands and graphics data to GPU 12 for rendering to display 8. The graphics data may include, e.g., drawing commands, state information, primitive information, texture information, etc. GPU 12 may, in some instances, be built with a highly-parallel structure that provides more efficient processing of complex graphic-related operations than CPU 6. For example, GPU 12 may include a plurality of processing elements, such as shader units, that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 8 more quickly than drawing the scenes directly to display 8 using CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. GPU 12 may include one or more processors, such as one or more microprocessors, application specific integrated circuits (ASICs), field programmable gate arrays (FPGAs), digital signal processors (DSPs), or other equivalent integrated or discrete logic circuitry. GPU 12 may also include one or more processor cores, so that GPU 12 may be referred to as a multi-core processor.

GPU 12 may be directly coupled to graphics memory 40. Thus, GPU 12 may read data from and write data to graphics memory 40 without using a bus. In other words, GPU 12 may process data locally using a local storage, instead of off-chip memory. Such graphics memory 40 may be referred to as on-chip memory. This allows GPU 12 to operate in a more efficient manner by eliminating the need of GPU 12 to read and write data via a bus, which may experience heavy bus traffic. In some instances, however, GPU 12 may not include a separate memory, but instead utilize system memory 10 via a bus. Graphics memory 40 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media.

In some examples, GPU 12 may store a fully formed image in system memory 10, where the image may be one or more surfaces. A surface, in some examples, may be a two dimensional block of pixels, where each of the pixels may have a color value. Throughout this disclosure, the term graphics data may, in a non-limiting example, include surfaces or portions of surfaces. Display processor 14 may retrieve the image from system memory 10 and output values that cause the pixels of display 8 to illuminate to display the image. Display 8 may the display of computing device 2 that displays the image content generated by GPU 12. Display 8 may be a liquid crystal display (LCD), an organic light emitting diode display (OLED), a cathode ray tube (CRT) display, a plasma display, or another type of display device.

In accordance with aspects of the present disclosure, computing device 2 may allocate a plurality of blocks in memory, such as system memory 10 or graphics memory 40, wherein each of the plurality of blocks is of a uniform fixed size in the memory. Computing device 2 may further store a plurality of bandwidth-compressed graphics data into the respective plurality of blocks in the memory, wherein one or more of the plurality of bandwidth-compressed graphics data has a size that is smaller than the fixed size. Computing device 2 may further store data associated with the plurality of bandwidth-compressed graphics data into unused space of one or more of the plurality of blocks that contains the respective one or more of the plurality of bandwidth-compressed graphics data.

Figure 2:
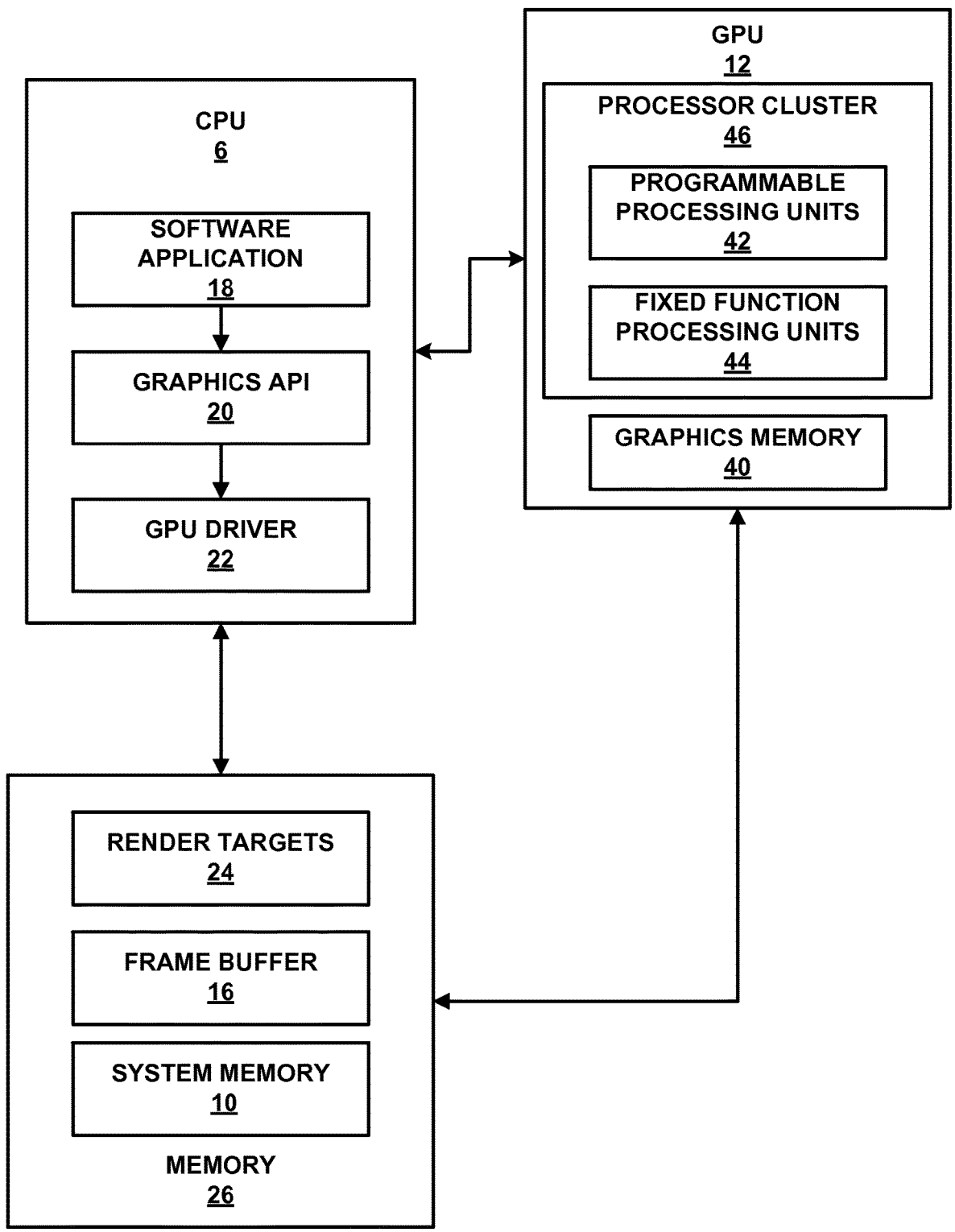
FIG. 2 is a block diagram illustrating example implementations of the CPU, the GPU, and the system memory of FIG. 1 in further detail.

FIG. 2 is a block diagram illustrating example implementations of CPU 6, GPU 12, and system memory 10 of FIG. 1 in further detail. As shown in FIG. 2, CPU 6 may include at least one software application 18, graphics API 20, and GPU driver 22, each of which may be one or more software applications or services that execute on CPU 6.

Memory available to CPU 6 and GPU 12 may include system memory 10, frame buffer 16, and render targets 24. Frame buffer 16 may be a part of system memory 10 or may be separate from system memory 10, and may store rendered image data. GPU 12 may also render image data for storage in render targets 24. Similar to frame buffer 16, render targets 24 may be a part of system memory 10 or may be separate from system memory 10.

Software application 18 may be any application that utilizes the functionality of GPU 12. For example, software application 18 may be a GUI application, an operating system, a portable mapping application, a computer-aided design program for engineering or artistic applications, a video game application, or another type of software application that uses 2D or 3D graphics.

Software application 18 may include one or more drawing instructions that instruct GPU 12 to render a graphical user interface (GUI) and/or a graphics scene. For example, the drawing instructions may include instructions that define a set of one or more graphics primitives to be rendered by GPU 12. In some examples, the drawing instructions may, collectively, define all or part of a plurality of windowing surfaces used in a GUI. In additional examples, the drawing instructions may, collectively, define all or part of a graphics scene that includes one or more graphics objects within a model space or world space defined by the application.

Software application 18 may invoke GPU driver 22, via graphics API 20, to issue one or more commands to GPU 12 for rendering one or more graphics primitives into displayable graphics images. For example, software application 18 may invoke GPU driver 22, via graphics API 20, to provide primitive definitions to GPU 12. In some instances, the primitive definitions may be provided to GPU 12 in the form of a list of drawing primitives, e.g., triangles, rectangles, triangle fans, triangle strips, etc. The primitive definitions may include vertex specifications that specify one or more vertices associated with the primitives to be rendered. The vertex specifications may include positional coordinates for each vertex and, in some instances, other attributes associated with the vertex, such as, e.g., color coordinates, normal vectors, and texture coordinates. The primitive definitions may also include primitive type information (e.g., triangle, rectangle, triangle fan, triangle strip, etc.), scaling information, rotation information, and the like. Based on the instructions issued by software application 18 to GPU driver 22, GPU driver 22 may formulate one or more commands that specify one or more operations for GPU 12 to perform in order to render the primitive. When GPU 12 receives a command from CPU 6, processor cluster 46 may execute a graphics processing pipeline to decode the command and may configure the graphics processing pipeline to perform the operation specified in the command. For example, a command engine of the graphics processing pipeline may read primitive data and assemble the data into primitives for use by the other graphics pipeline stages in the graphics processing pipeline. After performing the specified operations, GPU 12 outputs the rendered data to frame buffer 16 associated with a display device or to one of render targets 24.

Frame buffer 16 stores destination pixels for GPU 12. Each destination pixel may be associated with a unique screen pixel location. In some examples, frame buffer 16 may store color components and a destination alpha value for each destination pixel. For example, frame buffer 16 may store Red, Green, Blue, Alpha (RGBA) components for each pixel where the "RGB" components correspond to color values and the "A" component corresponds to a destination alpha value. Frame buffer 16 may also store depth values for each destination pixel. In this way, frame buffer 16 may be said to store graphics data (e.g., a surface). Although frame buffer 16 and system memory 10 are illustrated as being separate memory units, in other examples, frame buffer 16 may be part of system memory 10. Once GPU 12 has rendered all of the pixels of a frame into frame buffer 16, frame buffer may output the finished frame to display 8 for display.

Similar to frame buffer 16, each of render targets 24 may also stores destination pixels for GPU 12, including color values and/or depth values for pixels. Each of render targets 24 may store information for the same number of unique pixel locations as frame buffer 16 or may store a subset of the number of unique pixel locations as frame buffer 16.

Processor cluster 46 may include one or more programmable processing units 42 and/or one or more fixed function processing units 44. Programmable processing unit 42 may include, for example, programmable shader units that are configured to execute one or more shader programs that are downloaded onto GPU 12 from CPU 6. In some examples, programmable processing units 42 may be referred to as "shader processors" or "unified shaders," and may perform geometry, vertex, pixel, or other shading operations to render graphics. The shader units may each include one or more components for fetching and decoding operations, one or more ALUs for carrying out arithmetic calculations, one or more memories, caches, and registers.

GPU 12 may designate programmable processing units 42 to perform a variety of shading operations such as vertex shading, hull shading, domain shading, geometry shading, fragment shading, and the like by sending commands to programmable processing units 42 to execute one or more of a vertex shader stage, tessellation stages, a geometry shader stage, a rasterization stage, and a fragment shader stage in the graphics processing pipeline. In some examples, GPU driver 22 may cause a compiler executing on CPU 6 to compile one or more shader programs, and to download the compiled shader programs onto programmable processing units 42 contained within GPU 12. The shader programs may be written in a high level shading language, such as, e.g., an OpenGL Shading Language (GLSL), a High Level Shading Language (HLSL), a C for Graphics (Cg) shading language, an OpenCL C kernel, etc. The compiled shader programs may include one or more instructions that control the operation of programmable processing units 42 within GPU 12. For example, the shader programs may include vertex shader programs that may be executed by programmable processing units 42 to perform the functions of the vertex shader stage, tessellation shader programs that may be executed by programmable processing units 42 to perform the functions of the tessellation stages, geometry shader programs that may be executed by programmable processing units 42 to perform the functions of the geometry shader stage and/or fragment shader programs that may be executed by programmable processing units 42 to perform the functions of the fragment shader stage. A vertex shader program may control the execution of a programmable vertex shader unit or a unified shader unit, and include instructions that specify one or more per-vertex operations.

Processor cluster 46 may also include fixed function processing units 44. Fixed function processing units 44 may include hardware that is hard-wired to perform certain functions. Although fixed function processing units 44 may be configurable, via one or more control signals for example, to perform different functions, the fixed function hardware typically does not include a program memory that is capable of receiving user-compiled programs. In some examples, fixed function processing units 44 in processor cluster 46 may include, for example, processing units that perform raster operations, such as, e.g., depth testing, scissors testing, alpha blending, low resolution depth testing, etc. to perform the functions of the rasterization stage of the graphics processing pipeline.

Graphics memory 40 is on-chip storage or memory that physically integrated into the integrated circuit of GPU 12. In some instances, because graphics memory 40 is on-chip, GPU 12 may be able to read values from or write values to graphics memory 40 more quickly than reading values from or writing values to system memory 10 via a system bus.

In some examples, GPU 12 may operate according to a deferred rendering mode (also called binning rendering or tile-based rendering) to render graphics data. When operating according to the deferred rendering mode, processor cluster 46 within GPU 12 first performs a binning pass (also known as a tiling pass) to divide a frame into a plurality of tiles, and to determine which primitives are within each tiles. In some examples, the binning pass may indicate whether or not a primitive is within a tile. In other examples, the binning pass may also include a depth test and indicate whether or not a particular primitive is visible in a rendered tile. For each of the plurality of tiles, processor cluster 46 then renders graphics data (color values of the pixels) of the tile to graphics memory 40 located locally on GPU 12, including performing the graphics processing pipeline to render each tile, and, when complete, reads the rendered graphics data from graphics memory 40 to frame buffer 16 or one of render targets 24. In some examples, because each rendered tile includes the color values of the pixels of a two dimensional block of pixels, a tile may be considered a surface, or may be considered a portion of a surface that is the finally rendered image made up of a plurality of tiles.

GPU 12 may divide each tile into a plurality of blocks of pixels. The size of the blocks of pixels may be similar to the size of the blocks of pixels on display 8 that correspond to one storage location in the low resolution buffer. GPU 12 may transform primitives of each tile into screen space, and may order the primitives with respect to each other from front to back, testing sub-tiles of the current tile to determine: 1) whether each primitive is included within the given sub-tile; and 2) if included in the given sub-tile, whether pixels of the primitive are occluded by pixels of any other primitive in the particular sub-tile.

In some examples, during the binning pass, GPU 12 may also generate low resolution z (LRZ) data for blocks of pixels of each of the plurality of tiles and may store such LRZ data into a low resolution buffer in memory, such as system memory 10. Low resolution z refers to the fact that the low resolution buffer stores depth data associated with a block of pixels rather than for each pixel of each of the plurality of tiles. The low resolution buffer may be a two-dimensional buffer with a plurality of storage locations. Each storage location in the low resolution buffer may correspond to a block of pixels represented on display 8. In some examples, the number of storage locations within the low resolution buffer may be fewer than the number of pixels to be represented on display 8. An LRZ data may be depth data for a block of pixels (e.g., a 2×2 block of pixels) that contains the backmost depth value for the given block of pixels. A tile may be associated with one or more LRZ data. For example, given a tile that is an 8×8 block of pixel, the tile may include 16 LRZ data that are each associated with a given 2×2 pixel block of the tile, and each of the 16 LRZ data may contain the backmost depth value for the associated 2×2 pixel block of the tile.

GPU 12 may determine the LRZ data based on determining the depth values of pixels of primitives that occupy the block of pixels associated with the LRZ data. Because LRZ data is depth data for a block of pixels rather than for an individual pixel, GPU 12 may be conservative in determining the LRZ data for each block of pixels. For example, if LRZ data is a 2×2 block of pixels (p00, p01, p10, and p11), GPU 12 may set the corresponding LRZ data to be the depth data of the backmost pixel (i.e., the pixel that is furthest away from the camera). If pixels p00, p01, p10, and p11 have corresponding depth values of 0.1, 0.1, 0.2, and 0.15, respectively, where a lower value represents a depth that is further away from the camera than a higher value, GPU 12 may set the LRZ data for that pixel block to be 0.1.

After updating the low resolution buffer with depth information of the pixels making up the rendered surface, GPU 12 may, tile-by-tile, render an image to graphics memory 40 based on the depth values stored in the low resolution buffer. To render pixels, for each pixel on the display, GPU 12 may determine which pixels to render from which primitives in the tile based on the depth values stored within the low resolution buffer. If GPU 12 determines, based on the depth values stored within the low resolution buffer, that pixels of a primitive is occluded in the final scene, GPU 12 may determine to not perform further pixel shading or fragment shading operations on those occluded pixels, thereby improving the performance of GPU 12. After each tile is rendered to graphics memory 40, GPU 12 may transfer the rendered tile from graphics memory 40 to memory 26. In this way, frame buffer 16 or one of render targets 24 may be filled tile-by-tile by rendered tiles from GPU 12 and transferring each of the rendered tiles from graphics memory to frame buffer 16 or one of render targets 24, thereby rendering a surface into frame buffer 16 or one of render targets 24.

When GPU 12 attempts to render additional primitives into the rendered surface, GPU 12 may utilize the constructed LRZ data for the surface to optimize the rendering of those primitives. GPU 12 may rasterize those primitives into pixels via the techniques of this disclosure and may perform low resolution depth testing to discard pixels that GPU 12 determines to be occluded. GPU 12 may for each pixel, compare the depth value of the pixel with the depth value of the associated LRZ data (i.e., the LRZ data associated with the pixel location of the pixel being tested), and may discard the pixel if the depth value of the pixel is smaller (e.g., further away from the camera) than the depth value of the associated LRZ data. By discarding these occluded pixels, GPU 12 may omit the performance of any additional graphics rendering operations for those pixels, such as pixel shading operations and the like, thereby improving graphics processing performance of GPU 12.

In some situations, GPU 12 may not reject pixels as necessarily being occluded by other pixels when GPU 12 performs low resolution testing of those pixels using LRZ data even if those pixels may be rejected during pixel-level depth testing of individual pixels. For example, given an LRZ data that represents a 2×2 block of pixels (p00, p01, p10, and p11), the LRZ data may be a depth value of 0.1, where a lower value represents a depth that is further away from the camera than a higher value, even though pixel p01 may have an actual depth value of 0.2. Subsequently, GPU 12 may determine whether to render a primitive having new pixel p01' with a depth value of 0.15 at the same pixel location as pixel p01. Because the LRZ data is a depth value of 0.1, GPU 12 may nonetheless, based on the LRZ data, determine that the primitive associated with new pixel p01' will be visible in the finally rendered surface because the pixel p01' has a depth value of 0.15 is larger than the LRZ data's depth value of 0.1, even though the actual depth value of pixel p01 is 0.2. Due to GPU 12's determination that pixel p01' is visible based on the LRZ data, GPU 12 may perform graphics rendering operations for the pixel (e.g., fragment shading operations) before GPU 12 performs pixel-level depth testing on pixel p01' to determine that pixel p01' is not actually visible in the finally rendered scene and discards pixel p01', thereby preventing the color values of pixel p01' from being written into frame buffer 16 or one of render targets 24.

Because GPU 12 performs pixel-level depth testing of each pixel after low-resolution depth testing using LRZ data, the use of LRZ data may be considered optional. While low-resolution depth testing may discard pixels prior to GPU 12 performing pixel shading operations on those pixels, GPU 12 may still ultimately perform per-pixel depth testing of each undiscarded pixel after GPU 12 performs pixel shading operations on those pixels. Thus, low-resolution depth testing using LRZ data may be considered an optimization to GPU 12's processing that saves GPU 12 from expending its processing to perform pixel shading on certain pixels that are discarded as a result of low-resolution depth testing. As such, GPU 12 may still perform correctly to render graphics data even if GPU 12 does not perform low-resolution depth testing as part of its graphics processing.

GPU 12 may also determine a tile-based hash code for each rendered tile based on the color data of the block of pixels included in each rendered tile, such that a tile-based hash code uniquely identifies tiles having different color data for their block of pixels. As discussed above, each rendered tile is a block (e.g., 8×8) of pixels, where each pixel has a color value. GPU 12 may associate tiles that contain different patterns of pixel values (e.g., a tile completely filled with red pixels and a tile completely filled with green pixels) with different tile-based hash codes, and may associate tiles that contain the same pattern of pixel values (e.g., two tiles that are each completely filled with red pixels) with the same tile-based hash code.

Such tile-based hash codes may be useful when GPU 12 determines whether to perform a bit block transfer of color data corresponding to a tile from a first tile to a second tile. If the first tile and the second tile are each associated with the same tile-based hash code, GPU 12 may determine that no actual transfer of color data needs to occur because the first and second tiles contain the same set of color data for their respective blocks of pixels, thereby improving performance of computing device 2. In some examples, GPU 12 may determine a tile-based hash code for blocks of pixels that are smaller than the size of a tile. For example, if a tile comprises an 8×8 block of pixels, GPU 12 may nonetheless determine a tile-based hash code for each 4×4 block of pixels of a surface. In this case, each tile may be associated with four tile-based hash codes for each 4×4 block of pixels it contains.

As each rendered tile is transferred out of graphics memory 40 for storage in frame buffer 16 or one of render targets 24, GPU 12 may compress, via any suitable compression algorithm, each tile to more efficiently move the tile through the bus to frame buffer 16 or one of render targets 24. The resulting size of the compressed tiles may differ based on the variability of the contents of each tile. While some compressed tiles may be a fraction of the size of an uncompressed tile, other compressed tiles may be barely smaller than or the same size as that of an uncompressed tile or may not be compressed at all. Thus, a plurality of bandwidth-compressed tiles may include one or more uncompressed tiles amongst other compressed tiles.

In some examples, GPU 12 may determine a tile-based hash code for each compressed tile. Thus, rather than generating tile-based hash codes for the underlying surface color values of the uncompressed tile, GPU 12 may generate tile-based hash codes based on the data of each tile after compression, thereby acting as checksums for the plurality of compressed tiles. In this example, two tile-based hash codes may be the same if the two associated compressed tiles, after compression, are the same.

Because uncompressed tiles of a given rendered image are all the same size, frame buffer 16 or one of render targets 24 are configured to have enough space to store all of the uncompressed tiles of a surface in fixed-sized blocks that are each the same size as an uncompressed tile. Further, because compressing tiles that make up a surface may result in tiles of different sizes that vary on the color values of each specific tile, GPU 12 may not be able to allocate custom blocks of varying size in memory 26 specifically for storing the compressed tiles. Therefore GPU 12 may utilize the same plurality of blocks allocated for storing uncompressed tiles of a rendered image by storing the plurality of compressed tiles into the plurality of blocks, such that each compressed tile is stored in one of the blocks.

Due to memory 26 storing the compressed tiles in blocks that are each the same size as an uncompressed tile, memory 26 does not actually conserve any space by storing the plurality of compressed tiles instead of uncompressed tiles. Even though the plurality of compressed tiles may take up less space in memory 26 than uncompressed tiles, nevertheless the same amount of space in memory 26 is reserved for the plurality of blocks regardless of whether compressed tiles or uncompressed tiles are stored into the plurality of blocks.

Therefore, when GPU 12 stores the compressed tiles into the plurality of blocks, the plurality of blocks may include unused space that is not taken up by storing the plurality of compressed tiles. For each compressed tile that takes up less than the entire space of the corresponding block in which the compressed tile is stored, the corresponding block may have unused space. As such, according to the techniques of this disclosure, GPU 12 may be configured to utilize the unused space to store additional data that is associated with the rendered surface that is made up of the plurality of compressed tiles. For example, instead of storing LRZ data and tile-based hash codes for the plurality of compressed tiles in dedicated buffers in memory 26, GPU 12 may store such data in the unused space of the plurality of blocks.

Because unused space in a block that stores a compressed tile is not guaranteed, GPU 12 may be able to store data associated with a particular compressed tile, such as LRZ data and tile-based hash codes, only if the block that stores the particular compressed tile has unused space. However, if a compressed tile fully occupies a block, GPU 12 may not be able to store data associated with the particular compressed tile in the block. Thus, GPU 12 may be able to store data that are optional for each portion of the surface associated with a corresponding compressed tile. into the unused spaces of the blocks.

GPU 12 may determine the unused space available in each of the plurality of blocks resulting from the plurality of blocks storing the compressed tiles. For example, GPU 12 may determine the size of a block in the plurality of blocks, and may determine the size of each of the compressed tiles. If GPU 12 determines that the size of a particular compressed tile is smaller than the size of a block in the plurality of blocks, GPU 12 may determine that the block that stores the particular compressed tile may have unused space.

In response to GPU 12 determining that one or more of the plurality of blocks include unused space, GPU 12 may store optimization surfaces that GPU 12 may utilize to improve its performance into the unused space of the one or more of the plurality of blocks. For example, LRZ data is useful by indicating primitives that are not visible in the finally rendered surface by enabling GPU 12 to not perform rasterization of those primitives. However, without the LRZ data, GPU 12 may still correctly render a given surface by performing rasterization of primitives regardless of whether those primitives are visible in the finally rendered surface. As such, while LRZ data may improve the performance of GPU 12 as it renders a surface, it is not information that is critical for GPU 12 to correctly render a surface.

Tile-based hash codes are similar to LRZ data in that they are useful in improving the performance of GPU 12 but are not critical for GPU 12 to correctly perform graphics operations. Without tile-based hash codes, the GPU 12 may still correctly perform functions such as bit-block transfers of color data, but may perform redundant transfers of color data between portions of the surface that has the same block of color data.

Figure 3A:
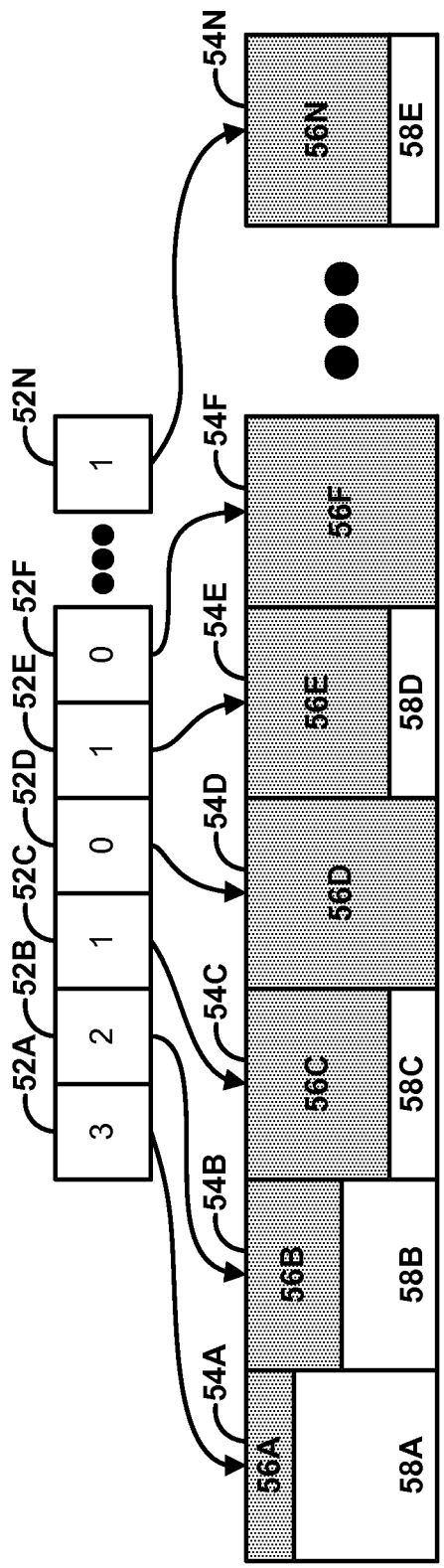

FIGS. 3A-3F are conceptual diagrams illustrating example techniques for storing bandwidth-compressed graphical data in memory. As shown in FIG. 3A, GPU 12 may store bandwidth-compressed graphics data 56A-56N ("bandwidth-compressed graphics data 56") into blocks 54A-54N ("blocks 54") in memory 26, such as system memory 10, frame buffer 16, one or more of render targets 24, and the like. Bandwidth-compressed graphics data 56, in some examples, may each be a tile (e.g., a portion of an image surface) making up a rendered scene or surface that is compressed by GPU 12 in order to more efficiently move graphics data through buses and between components of computing device 2 (e.g., between GPU 12 and memory 26).

Blocks 54 may be contiguous in memory 26 and may each be the same uniform fixed size to store each of bandwidth-compressed graphics data 56. In some examples, if each of bandwidth-compressed graphics data 56 is a bandwidth-compressed tile, GPU 12 may allocate, in memory 26, the same number of blocks 54 as the number of tiles making up a rendered surface, such that each one of blocks 54 may store a corresponding one of bandwidth-compressed graphics data 56.

Because each of blocks 54 is large enough to store uncompressed graphics data of a rendered surface, storing bandwidth-compressed graphics data 56 into blocks 54 may result in unused space remaining in blocks 54. In the example of FIG. 3A, unused space 58A, 58B, 58C, 58D, and 58E ("unused space 58") may remain in blocks 54A, 54B, 54C, 54E, and 54N, respectively, when blocks 54A, 54B, 54C, 54E, and 54N store respective bandwidth-compressed graphics data 56A, 56B, 56C, 56E, and 56N.

As discussed above, GPU 12 may determine whether each block of blocks 54 has unused space 58 by comparing the size of each bandwidth-compressed graphics data 56 with the size of a block of blocks 54. GPU 12 may create and store flag surfaces 52A-52N ("flag surfaces 52") in memory 26, where each of flag surfaces 52 is associated with one of blocks 54, and may indicate the amount of unused space in a corresponding block of blocks 54.

In the example of FIG. 3A, flag surfaces 52 may store the fraction, out of four, of the amount of unused space in a corresponding block of blocks 54. Flag surface 52A may indicate that unused space takes up ¾ of block 54A. Flag surface 52B may indicate that unused space takes up ½ of block 54B. Flag surface 52C may indicate that unused space takes up ¼ of block 54C. Flag surface 52D may indicate that block 54D has no unused space. Flag surface 52E may indicate that unused space takes up ¼ of block 54E. Flag surface 52F may indicate that block 54F has no unused space. Flag surface 52N may indicate that unused space takes up ¼ of block 54N. Because flag surfaces 52 is also stored in memory 26, storing bandwidth-compressed graphics data 56 in memory may take up more space in memory 26 than storing comparable uncompressed graphics data 56.

Figure 3B:
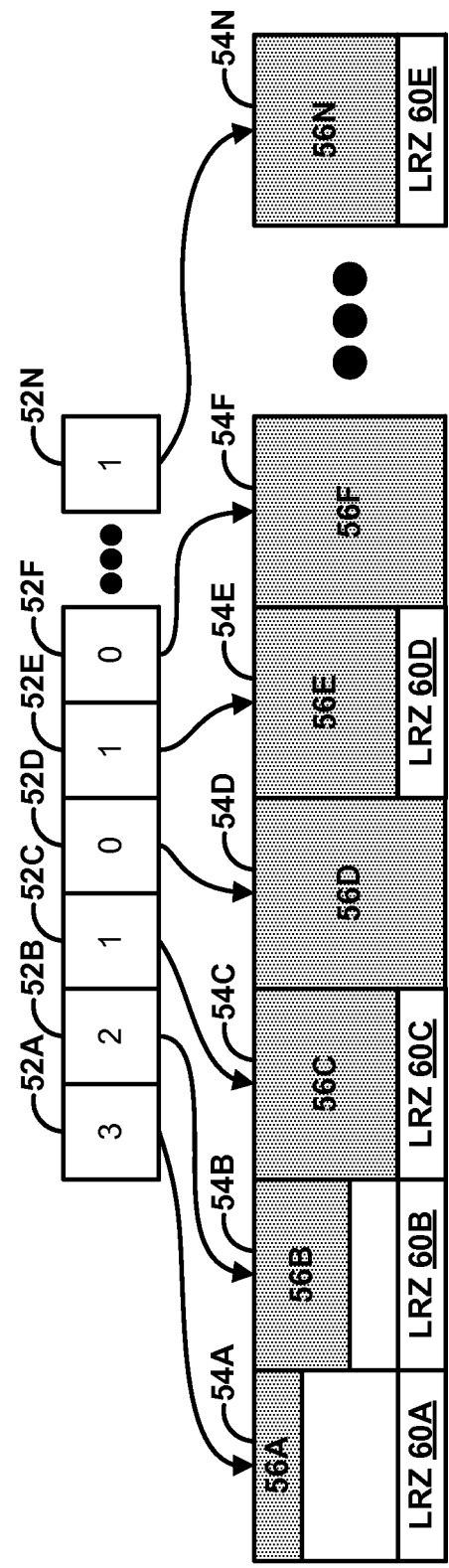

As discussed above, GPU 12 may store data associated with bandwidth-compressed graphics data 56 into unused space 58. As shown in FIG. 3B, GPU 12 may determine, based on flag surface 52, the blocks of blocks 54 that has unused space 58, and may store LRZ data 60A-60E into unused space 58A-58E of blocks 54. Each of LRZ data 60A-60E may be of a fixed size. Because only blocks 54A, 54B, 54C, 54E, and 54N have respective unused space 58A-58E, GPU 12 may, in the example of FIG. 3B, only store LRZ data 60A-60E that includes depth information for respective bandwidth-compressed graphics data 56A, 56B, 56C, 56E, and 56N into unused space 58 of blocks 54. Thus, depth information for bandwidth-compressed graphics data 56D and 56F are not stored into unused space 58 of blocks 54.

LRZ data 60A may be associated with bandwidth-compressed graphics data 56A in that LRZ data 60A may include LRZ data for the pixels that make up the portion of the surface that corresponds to bandwidth-compressed graphics data 56A. For example, if bandwidth-compressed graphics data 56A includes graphics data with respect to a particular 8×8 block of pixels, LRZ data 60A, in one example, may include a corresponding plurality of LRZ data for each 2×2 pixel block of the 8×8 block of pixels. Similarly, LRZ data 60B may include LRZ data for the pixels that make up the portion of the surface that corresponds to bandwidth-compressed graphics data 56B, LRZ data 60C may include LRZ data for the pixels that make up the portion of the surface that corresponds to bandwidth-compressed graphics data 56C, LRZ data 60D may include LRZ data for the pixels that make up the portion of the surface that corresponds to bandwidth-compressed graphics data 56E, and LRZ data 60E may include LRZ data for the pixels that make up the portion of the surface that corresponds to bandwidth-compressed graphics data 56N.

For bandwidth-compressed graphics data 56D and 56F that do not have associated LRZ data stored in associated blocks 54D and 54F, GPU 12 may associate a default depth value with each of bandwidth-compressed graphics data 56D and 56F that fully occupy their respective blocks 54D and 54F. The default depth value may be a backmost depth value that indicates that additional pixels to be rendered into the portions of the surface associated with bandwidth-compressed graphics data 56D and 56F are in front of the pixels of the portions of the surface associated with bandwidth-compressed graphics data 56D and 56F, and thus will be visible, regardless of whether those additional pixels are actually visible in the finally rendered scene.

To accommodate depth information for each of bandwidth-compressed graphics data 56, GPU 12 may store depth information for multiple bandwidth-compressed graphics data 56 into the unused space 58 of a single block of blocks 54. As shown in FIG. 3C, GPU 12 may store LRZ data 60F into unused space 58A of block 54A that includes LRZ data for multiple consecutive bandwidth-compressed graphics data 56. LRZ data stored into unused space 58 of a single block of block 54 may include depth information for the associated bandwidth-compressed graphics data of bandwidth-compressed graphics data 56 as well as depth information for a next consecutive specified number of bandwidth-compressed graphics data 56. For example, if the LRZ data stored into unused space 58 of a single block of block 54 may include LRZ data for six of bandwidth-compressed graphics data 56, LRZ data 60F may include depth data for bandwidth-compressed graphics data 56A-56F. Similarly, LRZ data 60G may include depth data for bandwidth-compressed graphics data 56N as well as the next five subsequent bandwidth-compressed graphics data 56. In this way, blocks 54 may store depth data for each bandwidth-compressed graphics data 56.

As shown in FIG. 3D, GPU 12 may also store tile-based hash codes 62A-62E into unused space 58A-58E of blocks 54. Each of tile-based hash codes 62A-62E may be of the same size. Because only blocks 54A, 54B, 54C, 54E, and 54N have respective unused space 58A-58E, GPU 12 may, in the example of FIG. 3B, only store tile-based hash codes 62A-62E that identifies the color values for respective bandwidth-compressed graphics data 56A, 56B, 56C, 56E, and 56N into unused space 58 of blocks 54. Thus, tile-based hash codes for bandwidth-compressed graphics data 56D and 56F are not stored into unused space 58 of blocks 54.

Figure 3E:
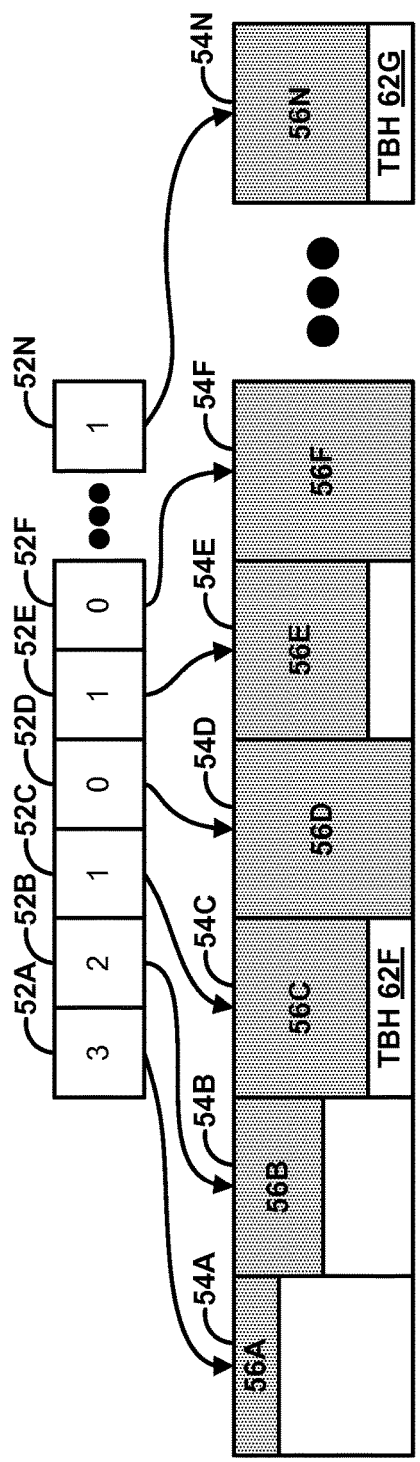

To accommodate tile-based hash codes for each of bandwidth-compressed graphics data 56, GPU 12 may store tile-based hash codes for multiple bandwidth-compressed graphics data 56 into the unused space 58 of a single block of blocks 54. As shown in FIG. 3E, GPU 12 may store tile-based hash code 62F into unused space 58C of block 54C that includes tile-based hash codes for multiple consecutive bandwidth-compressed graphics data 56. Tile-based hash codes stored into unused space 58 of a single block of block 54 may include tile-based hash codes for the associated bandwidth-compressed graphics data of bandwidth-compressed graphics data 56 as well as tile-based hash codes for a next consecutive specified number of bandwidth-compressed graphics data 56 or a previous consecutive number of bandwidth-compressed graphics data 56. For example, if the tile-based hash codes stored into unused space 58 of a single block of block 54 may include LRZ data for three of bandwidth-compressed graphics data 56, tile-based hash code 62F may include tile-based hash codes for each of bandwidth-compressed graphics data 56A-56C. Similarly, tile-based hash code 62G may include tile-based hash codes for bandwidth-compressed graphics data 56N as well as the previous two bandwidth-compressed graphics data 56. In this way, blocks 54 may store tile-based hash codes for each bandwidth-compressed graphics data 56.

Figure 3F:
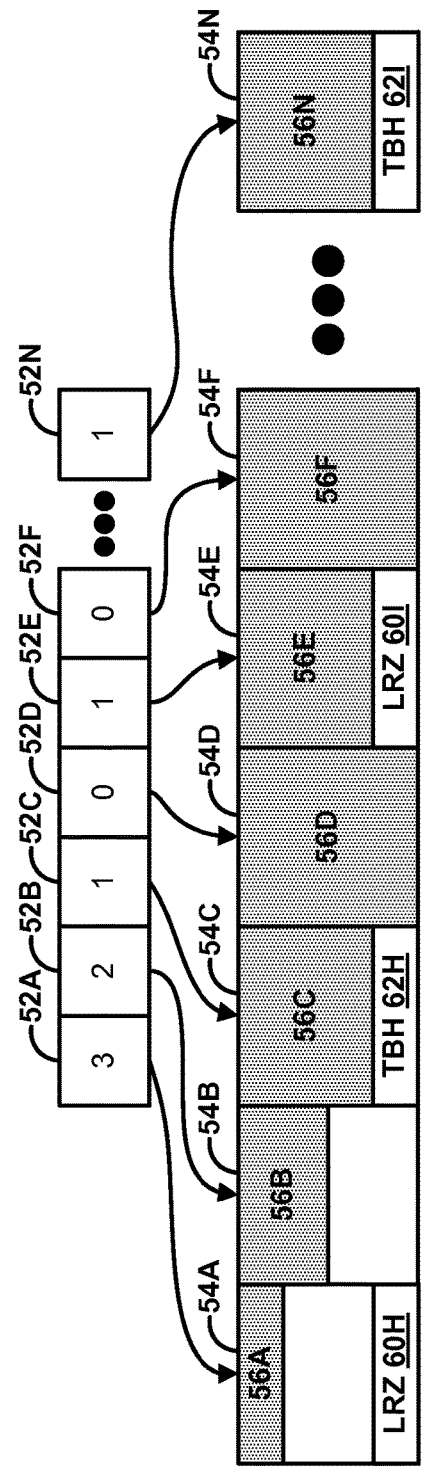

In some examples, GPU 12 may store multiple types of data associated with bandwidth-compressed graphics data 56 into unused space 58 of blocks 54 at the same time. For example, unused space 58 of blocks 54 may store both depth data as well as tile-based hash codes for each of bandwidth-compressed graphics data 56. As shown in FIG. 3F, GPU 12 may store LRZ data 60H into unused space 58A of block 54A and LRZ data 60I into unused space 58D of block 54E. GPU 12 may also store tile-based hash code 62H into unused space 58C of block 54A and tile-based hash code 62I into unused space 58E of block 54N. As such, unused space 58 of blocks 54 may store both LRZ data and tile-based hash codes for bandwidth-compressed graphics data 56 at the same time.

While FIGS. 3A-3F illustrate that GPU 12 is able to store LRZ data and tile-based hash codes into unused space 58 of blocks 54, this disclosure is not necessarily limited to storing only LRZ data and tile-based hash codes into unused space 58 of blocks 54. Rather, GPU 12 may store any other data related to bandwidth-compressed graphics data 56 into unused space 58 of blocks 54.

Figure 4:
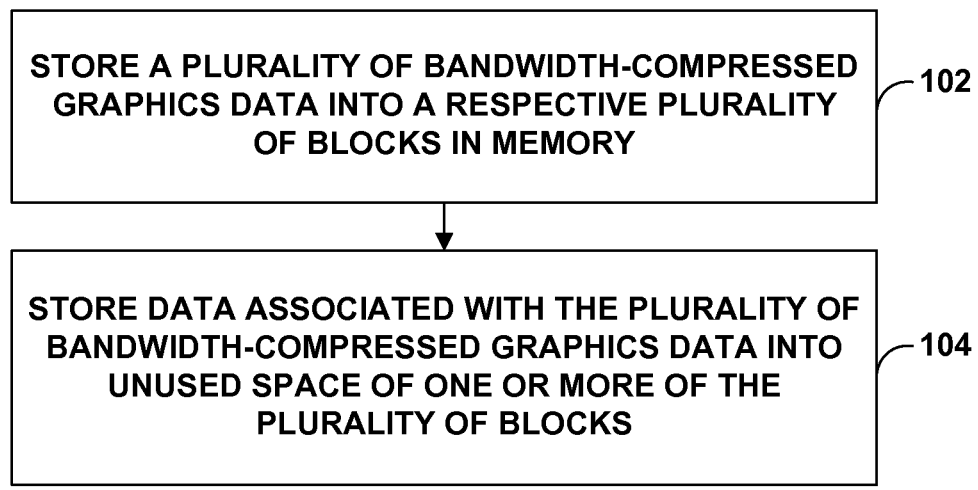
FIG. 4 is a flowchart illustrating an example process for storing bandwidth-compressed graphical data in memory.

FIG. 4 is a flowchart illustrating an example process for storing bandwidth-compressed graphical data in memory. As shown in FIG. 4, the process may include storing, by GPU 12, a plurality of bandwidth-compressed graphics data 56 into a respective plurality of blocks 54 in memory 26, wherein each of the plurality of blocks 54 is of a uniform fixed size in the memory 26, and wherein one or more of the plurality of bandwidth-compressed graphics data 56 has a size that is smaller than the fixed size (102). The process may further include storing, by GPU 12, data associated with the plurality of bandwidth-compressed graphics data 56 into unused space 58 of one or more of the plurality of blocks 54 that contains the respective one or more of the plurality of bandwidth-compressed graphics data 56 (104).

In some examples, the data associated with the plurality of bandwidth-compressed graphics data 56 comprises depth data for the one or more of the plurality of bandwidth-compressed graphics data 56 stored in the one or more of the plurality of blocks 54. In some examples, a second one or more of the plurality of bandwidth-compressed graphics data 56 may fully occupy a second one or more of the plurality of blocks 54, and the process may further include associating, by GPU 12, a default depth value for each of the second one or more of the plurality of bandwidth-compressed graphics data 56. In some examples, the data associated with the plurality of bandwidth-compressed graphics data 56 comprises depth data for each of the plurality of bandwidth-compressed graphics data 56 stored in the one or more of the plurality of blocks 54.

In some examples, the data associated with the plurality of bandwidth-compressed graphics data 56 comprises one or more hash codes that identify each of the one or more of the plurality of bandwidth-compressed graphics data 56 stored in the one or more of the plurality of blocks 54. In some examples, the data associated with the plurality of bandwidth-compressed graphics data 56 comprises hash codes that identify each of the plurality of bandwidth-compressed graphics data 56 stored in the one or more of the plurality of blocks 54.

In some examples, the data associated with the plurality of bandwidth-compressed graphics data 56 comprises hash codes that identify each of the plurality of bandwidth-compressed graphics data 56 stored in the one or more of the plurality of blocks 54 and depth data for each of the plurality of bandwidth-compressed graphics data 56 stored in the one or more of the plurality of blocks 54.

In some examples, the data associated with the plurality of bandwidth-compressed graphics data 56 comprises optimization surfaces associated with the plurality of bandwidth-compressed graphics data 56. In some examples, the plurality of bandwidth-compressed graphics data 56 may comprise bandwidth-compressed portions of an image surface.

In some examples, storing, by GPU 12, the data associated with the plurality of bandwidth-compressed graphics data 56 into the unused space of the one or more of the plurality of blocks 54 that contains the respective one or more of the plurality of bandwidth-compressed graphics data 56 may further include determining, by GPU 12, that the one or more of the plurality of blocks 54 include the unused space, and in response to determining that the one or more of the plurality of blocks 54 include the unused space, storing, by GPU 12, the data associated with the plurality of bandwidth-compressed graphics data 56 into the unused space of the one or more of the plurality of blocks 54 that contains the respective one or more of the plurality of bandwidth-compressed graphics data 56.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor" and "processing unit," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:

allocating, by at least one processor, a plurality of blocks in memory, wherein each of the plurality of blocks is of a uniform fixed size in the memory;

storing, by the at least one processor, each of a plurality of bandwidth-compressed graphics data associated with each of a plurality of portions of an image into a respective block of the plurality of blocks in the memory, including storing a first one or more of the plurality of bandwidth-compressed graphics data into a first one or more of the plurality of blocks, and storing a second one or more of the plurality of bandwidth-compressed graphics data into a second one or more of the plurality of blocks, wherein each of the first one or more of the plurality of bandwidth-compressed graphics data has a size that is smaller than the fixed size, and wherein each of the second one or more of the plurality of bandwidth-compressed graphics data fully occupies each of the respective second one or more of the plurality of blocks;

storing, by the at least one processor, optimization surfaces associated with at least the first one or more of the plurality of bandwidth-compressed graphics data into one or more unoccupied spaces of the first one or more of the plurality of blocks allocated in the memory that contains the respective first one or more of the plurality of bandwidth-compressed graphics data based at least in part on a determination that the first one or more of the plurality of blocks includes the one or more unoccupied spaces that is not occupied by the first one or more of the plurality of bandwidth-compressed graphics data, including storing a first optimization surface into a first unoccupied space of a first block of the first one or more of the plurality of blocks and storing a second optimization surface into a second unoccupied space of a second block of the first one or more of the plurality of blocks, wherein the first unoccupied space is a result of a first bandwidth-compressed graphics data not fully occupying the first block, and the second unoccupied space is a result of a second bandwidth-compressed data not fully occupying the second block, wherein the first unoccupied space is different in size from the second unoccupied space, and wherein the optimization surfaces associated with the plurality of bandwidth-compressed graphics data include depth data for each of at least the first one or more of the plurality of bandwidth-compressed graphics data for optimizing performance of graphics operations on at least the first one or more of the plurality of bandwidth-compressed graphics data;

performing graphics operations on the first one or more of the plurality of bandwidth-compressed graphics data using the optimization surfaces; and performing graphics operations on the second one or more of the plurality of bandwidth-compressed graphics data without using the optimization surfaces.

2. The method of claim 1, wherein the optimization surfaces associated with the first one or more of the plurality of bandwidth-compressed graphics data comprise depth data for the first one or more of the plurality of bandwidth-compressed graphics data stored in the first one or more of the plurality of blocks.

3. The method of claim 2, further comprising:

associating, by the at least one processor, a default depth value for each of the second one or more of the plurality of bandwidth-compressed graphics data that fully occupies the second one or more of the plurality of blocks.

4. The method of claim 3, wherein the default depth value indicates each of the second one or more of the plurality of bandwidth-compressed graphics data is always visible for rasterization.

5. The method of claim 1, wherein the optimization surfaces associated with the first one or more of the plurality of bandwidth-compressed graphics data comprise depth data for each of the plurality of bandwidth-compressed graphics data stored in the plurality of blocks.

6. The method of claim 1, wherein the optimization surfaces associated with the first one or more of the plurality of bandwidth-compressed graphics data further comprise one or more hash codes that identify each of the first one or more of the plurality of bandwidth-compressed graphics data stored in the first one or more of the plurality of blocks.

7. The method of claim 1, wherein the optimization surfaces associated with the first one or more of the plurality of bandwidth-compressed graphics data further comprise hash codes that identify each of the plurality of bandwidth-compressed graphics data stored in the plurality of blocks.

8. The method of claim 1, wherein the plurality of bandwidth-compressed graphics data comprises bandwidth-compressed portions of an image surface.

9. The method of claim 1, wherein storing, by the at least one processor, the optimization surfaces associated with the first one or more of the plurality of bandwidth-compressed graphics data into the one or more unoccupied spaces of the first one or more of the plurality of blocks that contains the respective first one or more of the plurality of bandwidth-compressed graphics data further comprises:

determining, by the at least one processor, that the first one or more of the plurality of blocks include the one or more unoccupied spaces; and in response to determining that the first one or more of the plurality of blocks include the one or more unoccupied spaces, storing, by the at least one processor, the optimization surfaces associated with the first one or more of the plurality of bandwidth-compressed graphics data into the one or more unoccupied spaces of the first one or more of the plurality of blocks that contains the respective first one or more of the plurality of bandwidth-compressed graphics data.

10. The method of claim 1, wherein the at least one processor includes a graphics processing unit.

11. An apparatus configured to process graphics data comprising:

a memory; and at least one processor configured to:

allocate a plurality of blocks in the memory, wherein each of the plurality of blocks is of a uniform fixed size in the memory;

store each of a plurality of bandwidth-compressed graphics data associated with each of a plurality of portions of an image into a respective block of the plurality of blocks in the memory, including storing a first one or more of the plurality of bandwidth-compressed graphics data into a first one or more of the plurality of blocks, and storing a second one or more of the plurality of bandwidth-compressed graphics data into a second one or more of the plurality of blocks, wherein each of the first one or more of the plurality of bandwidth-compressed graphics data has a size that is smaller than the fixed size, and wherein each of the second one or more of the plurality of bandwidth-compressed graphics data fully occupies each of the respective second one or more of the plurality of blocks;

store optimization surfaces associated with at least the first one or more of the plurality of bandwidth-compressed graphics data into one or more unoccupied spaces of the first one or more of the plurality of blocks allocated in the memory that contains the respective first one or more of the plurality of bandwidth-compressed graphics data based at least in part on a determination that the first one or more of the plurality of blocks includes the one or more unoccupied spaces that is not occupied by the first one or more of the plurality of bandwidth-compressed graphics data, including storing a first optimization surface into a first unoccupied space of a first block of the first one or more of the plurality of blocks and storing a second optimization surface into a second unoccupied space of a second block of the first one or more of the plurality of blocks, wherein the first unoccupied space is a result of a first bandwidth-compressed graphics data not fully occupying the first block, and the second unoccupied space is a result of a second bandwidth-compressed data not fully occupying the second block, wherein the first unoccupied space is different in size from the second unoccupied space, and wherein the optimization surfaces are associated with the plurality of bandwidth-compressed graphics data include depth data for each of the first one or more of the plurality of bandwidth-compressed graphics data stored in the plurality of blocks for optimizing performance of graphics operations on at least the first one or more of the plurality of bandwidth-compressed graphics data;

perform graphics operations on the first one or more of the plurality of bandwidth-compressed graphics data using the optimization surfaces; and perform graphics operations on the second one or more of the plurality of bandwidth-compressed graphics data without using the optimization surfaces.

12. The apparatus of claim 11, wherein the optimization surfaces associated with the first one or more of the plurality of bandwidth-compressed graphics data comprise depth data for the first one or more of the plurality of bandwidth-compressed graphics data stored in the first one or more of the plurality of blocks.

13. The apparatus of claim 12, wherein the at least one processor is further configured to:

associate a default depth value for each of the second one or more of the plurality of bandwidth-compressed graphics data, that fully occupies the second one or more of the plurality of blocks.

14. The apparatus of claim 11, wherein the optimization surfaces associated with the first one or more of the plurality of bandwidth-compressed graphics data comprise depth data for each of the plurality of bandwidth-compressed graphics data stored in the plurality of blocks.

15. The apparatus of claim 11, wherein the optimization surfaces associated with the first one or more of the plurality of bandwidth-compressed graphics data further comprise one or more hash codes that identify each of the first one or more of the plurality of bandwidth-compressed graphics data stored in the first one or more of the plurality of blocks.

16. The apparatus of claim 11, wherein the optimization surfaces associated with the first one or more of the plurality of bandwidth-compressed graphics data further comprise hash codes that identify each of the plurality of bandwidth-compressed graphics data stored in the plurality of blocks.

17. The apparatus of claim 11, wherein the plurality of bandwidth-compressed graphics data comprises bandwidth-compressed portions of an image surface.

18. The apparatus of claim 11, wherein the at least one processor is further configured to:

determine that the first one or more of the plurality of blocks include the one or more unoccupied spaces; and in response to determining that the first one or more of the plurality of blocks include the one or more unoccupied spaces, store the optimization surfaces associated with the first one or more of the plurality of bandwidth-compressed graphics data into the one or more unoccupied spaces of the first one or more of the plurality of blocks that contains the respective first one or more of the plurality of bandwidth-compressed graphics data.

19. The apparatus of claim 11, wherein the at least one processor includes a graphics processing unit.

20. An apparatus comprising:

means for allocating a plurality of blocks in memory, wherein each of the plurality of blocks is of a uniform fixed size in the memory;

means for storing each of a plurality of bandwidth-compressed graphics data associated with each of a plurality of portions of an image into a respective block of the plurality of blocks in the memory, including means for storing a first one or more of the plurality of bandwidth-compressed graphics data into a first one or more of the plurality of blocks, and means for storing a second one or more of the plurality of bandwidth-compressed graphics data into a second one or more of the plurality of blocks, wherein each of the first one or more of the plurality of bandwidth-compressed graphics data has a size that is smaller than the fixed size, and wherein each of the second one or more of the plurality of bandwidth-compressed graphics data fully occupies each of the respective second one or more of the plurality of blocks;

means for storing optimization surfaces associated with at least the first one or more of the plurality of bandwidth-compressed graphics data into one or more unoccupied spaces of the first one or more of the plurality of blocks allocated in the memory that contains the respective first one or more of the plurality of bandwidth-compressed graphics data based at least in part on a determination that the first one or more of the plurality of blocks includes the one or more unoccupied spaces that is not occupied by the first one or more of the plurality of bandwidth-compressed graphics data, including means for storing a first optimization surface into a first unoccupied space of a first block of the first one or more of the plurality of blocks and storing a second optimization surface into a second unoccupied space of a second block of the first one or more of the plurality of blocks, wherein the first unoccupied space is a result of a first bandwidth-compressed graphics data not fully occupying the first block, and the second unoccupied space is a result of a second bandwidth-compressed data not fully occupying the second block, wherein the first unoccupied space is different in size from the second unoccupied space, and wherein the optimization surfaces associated with the plurality of bandwidth-compressed graphics data include depth data for each of at least the first one or more of the plurality of bandwidth-compressed graphics data for optimizing performance of graphics operations on at least the first one or more of the plurality of bandwidth-compressed graphics data;

means for performing graphics operations on the first one or more of the plurality of bandwidth-compressed graphics data using the optimization surfaces; and means for performing graphics operations on the second one or more of the plurality of bandwidth-compressed graphics data without using the optimization surfaces.

21. The apparatus of claim 20, wherein the optimization surfaces associated with the first one or more of the plurality of bandwidth-compressed graphics data comprise depth data for the first one or more of the plurality of bandwidth-compressed graphics data stored in the first one or more of the plurality of blocks.

22. The apparatus of claim 21, further comprising:
means for associating a default depth value for each of the second one or more of the plurality of bandwidth-compressed graphics data that fully occupies the second one or more of the plurality of blocks.

23. The apparatus of claim 20, wherein the optimization surfaces associated with the first one or more of the plurality of bandwidth-compressed graphics data comprise depth data for each of the plurality of bandwidth-compressed graphics data stored in the plurality of blocks.

24. The apparatus of claim 20, wherein the optimization surfaces associated with the first one or more of the plurality of bandwidth-compressed graphics data further comprise one or more hash codes that identify each of the first one or more of the plurality of bandwidth-compressed graphics data stored in the first one or more of the plurality of blocks.

25. The apparatus of claim 20, wherein the optimization surfaces associated with the first one or more of the plurality of bandwidth-compressed graphics data further comprise hash codes that identify each of the plurality of bandwidth-compressed graphics data stored in the plurality of blocks.

26. The apparatus of claim 20, wherein the means for storing further comprises:
means for determining that the first one or more of the plurality of blocks include the one or more unoccupied spaces; and means for, in response to determining that the first one or more of the plurality of blocks include the one or more unoccupied spaces, storing the optimization surfaces associated with the first one or more of the plurality of bandwidth-compressed graphics data into the one or more unoccupied spaces of the first one or more of the plurality of blocks that contains the respective first one or more of the plurality of bandwidth-compressed graphics data.

* * * * *